(12) United States Patent
Song (10) Patent No.: US 10,331,098 B2
(45) Date of Patent: Jun. 25, 2019

(54) PLAYBACK CONTROL METHOD, PLAYER DEVICE, AND STORAGE MEDIUM

(71) Applicant: TENCENT TECHNOLOGY (SHENZHEN) COMPANY LIMITED, Shenzhen, Guangdong (CN)

(72) Inventor: Bo Song, Guangdong (CN)

(73) Assignee: GUANGZHOU KUGOU COMPUTER TECHNOLOGY CO., LTD., Guangzhou, Guangdong (KR)

( * ) Notice: Subject to any disclaimer, the term of this patent is extended or adjusted under 35 U.S.C. 154(b) by 12 days.

(21) Appl. No.: 15/167,312

(22) Filed: May 27, 2016

(65) Prior Publication Data

US 2016/0274861 A1    Sep. 22, 2016

Related U.S. Application Data

(63) Continuation of application No. PCT/CN2015/072070, filed on Feb. 2, 2015.

(30) Foreign Application Priority Data

Dec. 3, 2013 (CN) .......................... 2013 1 0643202

(51) Int. Cl.
*G06F 17/00* (2019.01)
*G05B 15/02* (2006.01)
(Continued)

(52) U.S. Cl.
CPC ............ *G05B 15/02* (2013.01); *H04L 63/083* (2013.01); *H04L 67/306* (2013.01); *H04M 1/72558* (2013.01); *H04N 21/43615* (2013.01)

(58) Field of Classification Search
CPC ........ H04L 2012/2849; H04L 63/0876; H04M 2250/02; H04M 1/6066; H04N 21/43615
See application file for complete search history.

(56) References Cited

U.S. PATENT DOCUMENTS

| 2007/0111796 | A1  | 5/2007 | Giaimo et al. |
| 2007/0211907 | A1* | 9/2007 | Eo ............................ H04R 5/04 381/79 |

(Continued)

FOREIGN PATENT DOCUMENTS

| CN | 101835279 A | 9/2010 |
| CN | 102137697 A | 7/2011 |

(Continued)

OTHER PUBLICATIONS

International Search Report with English translation and Written Opinion of the ISA for PCT/CN2015/072070, ISA/CN, Haidian District, Beijing, dated May 6, 2015.

(Continued)

*Primary Examiner* — Thomas H Maung
(74) *Attorney, Agent, or Firm* — Harness, Dickey & Pierce, P.L.C.

(57) ABSTRACT

A playback control method, a player device, and a storage medium are provided. The method comprises: establishing the correspondence between a playback device and an account; establishing a connection between the playback device and the player device; allowing the account login via the correspondence between the playback device and the account; receiving and executing the playback control operation instruction of the playback device. By establishing a correspondence between the playback device and the account, once the connection between the playback device and the player is established, the account login can be directly allowed via the correspondence between the player and the account.

14 Claims, 3 Drawing Sheets

(51) Int. Cl.
*H04L 29/08* (2006.01)
*H04L 29/06* (2006.01)
 H04M 1/725 (2006.01)
 H04N 21/436 (2011.01)

(56) References Cited

U.S. PATENT DOCUMENTS

| | | | | |
|---|---|---|---|---|
| 2009/0186580 | A1* | 7/2009 | Kim | H04M 1/6066 |
| | | | | 455/41.3 |
| 2010/0260348 | A1* | 10/2010 | Bhow | H04N 21/25891 |
| | | | | 381/81 |
| 2011/0065389 | A1* | 3/2011 | Masuda | H04M 1/7253 |
| | | | | 455/41.2 |
| 2012/0058754 | A1* | 3/2012 | Couse | H04M 1/7253 |
| | | | | 455/416 |
| 2012/0322376 | A1* | 12/2012 | Couse | H04M 1/7253 |
| | | | | 455/41.2 |

FOREIGN PATENT DOCUMENTS

| | | |
|---|---|---|
| CN | 102469453 A | 5/2012 |
| CN | 102571160 A | 7/2012 |
| CN | 102917113 A | 2/2013 |
| CN | 103402011 A | 11/2013 |
| CN | 104091606 A | 10/2014 |
| WO | WO-2012083567 A1 | 6/2012 |

OTHER PUBLICATIONS

First Chinese Office Action regarding Application No. 201310643202.3 dated Sep. 16, 2015. English translation provided by Global Dossier.

\* cited by examiner

PLAYBACK CONTROL METHOD, PLAYER DEVICE, AND STORAGE MEDIUM

CROSS REFERENCE TO RELATED APPLICATION

The present application is a continuation application of International Application No. PCT/CN2015/072070 filed on Feb. 2, 2015, which claims the priority to Chinese Patent Application No. 201310643202.3, titled "PLAY CONTROLLING METHOD AND DEVICE", filed on Dec. 3, 2013 with the State Intellectual Property Office of the People's Republic of China, both of which are incorporated herein by reference in entirety.

TECHNICAL FIELD

The present disclosure relates to the technical field of communications, and in particular to a play controlling method, a player device and a storage medium.

BACKGROUND

Player usually refers to software which can play video or audio files stored in form of digital signals, and also refers to an electronic product with a function of playing video or audio files. Besides a few waveform files, most of players are provided with a decoder to restore compressed media files, and need a full set of algorithms for frequency conversion and buffering. Music player is a kind of player.

At present, a flow for enabling a playing device to be authenticated to implement playing usually includes: the playing device establishing a connection with a player device, then a user inputting an account and a password of the playing device to complete login, and the player device receiving and performing play control for the playing device. The player device may be any of various terminal devices provided with a player.

In the above solution, the user needs to input the account and the password to complete the login. Therefore, the above solution is troublesome and results in low login efficiency.

SUMMARY

A play controlling method, a player device and a storage medium are provided according to embodiments of the present disclosure, so as to provide a solution suitable for a playing device to quickly log in.

A play controlling method is provided, which includes:
establishing a correspondence between a playing device and an account;
establishing a connection between the playing device and a player device;
allowing login of the account based on the correspondence between the playing device and the account; and
receiving and executing a play control operating instruction of the playing device.

A player device is provided, including one or more processors and a storage medium having operating instructions stored thereon, where the one or more processors are configured to, when executing the operating instructions stored in the storage medium, execute the following steps:
establishing a correspondence between a playing device and an account;
establishing a connection with the playing device;
allowing login of the account based on the correspondence between the playing device and the account; and
receiving and executing a play control operating instruction of the playing device.

A non-transitory computer readable storage medium having computer executable instructions stored thereon is provided, where the computer executable instructions, when being executed by a computer, enables the computer to:
establishing, a correspondence between a playing device and an account;
establishing a connection between the playing device and a player device;
allowing login of the account based on the correspondence between the playing device and the account; and
receiving and executing a play control operating instruction of the playing device.

In the above technical solutions, by establishing the correspondence between the playing device and the account, the login of the account may be directly allowed based on the correspondence between the playing device and the account after the connection between the playing device and the player device is established. In this case, a user does not need to input the account and a password, and quick login is achieved conveniently and quickly.

DETAILED DESCRIPTION OF THE EMBODIMENTS

In order to make the object, the technical solutions, and the advantages of the present disclosure clearer, the present disclosure is further described in detail hereinafter with reference to the drawings. Apparently, the described embodiments are only a few but not all of embodiments of the present invention. Any other embodiments obtained by those ordinarily skilled in the art based on the embodiments of the present disclosure without any creative efforts fall within the protection scope of the present disclosure.

Figure 1:
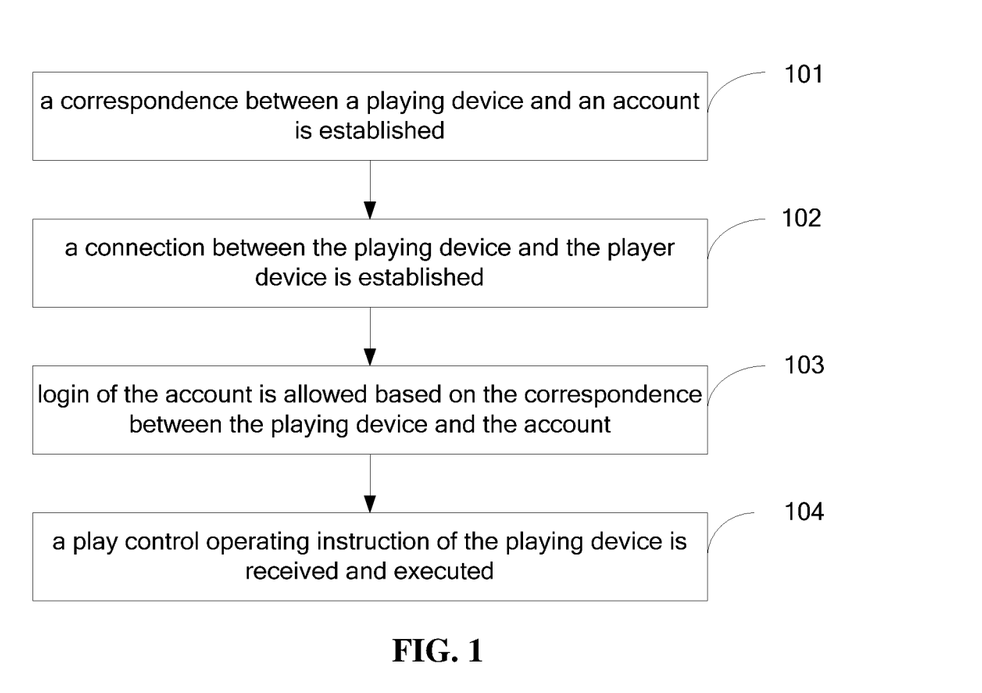
FIG. 1 is a schematic flow chart of a play controlling method according to an embodiment of the present disclosure.

A play controlling method is provided according to an embodiment of the present disclosure. The method may be applied to a player device such as a mobile phone terminal or a personal computer. As shown in FIG. 1, the method includes steps 101 to 104.

In step 101, a correspondence between a playing device and an account is established.

In the embodiment, when a connection between the playing device and the player device is established for a first time, the player device may receive the account and a password corresponding to the playing device, and establish and store the correspondence between the playing device and the account after the account and the password are determined to be valid.

In case of multiple playing devices, the player device may establish and store correspondences between the multiple playing devices and accounts, based on the accounts and passwords corresponding to the multiple playing devices.

In step 102, a connection between the playing device and the player device is established.

In the embodiment, the connection between the player device and the playing device may be a wired connection or a wireless connection, which would not affect implementations of the embodiments of the present disclosure. In order to perform play control operation freely and easily in various manners without the troubles caused by wires, the establishing a connection between the player device and the playing device preferably includes: establishing a wireless connection between the player device and the playing device.

The wireless connection is a preferred implementation, and should not be interpreted as the only implementation of connection mode used for establishing the connection between the player device and the playing device. Therefore, a wireless connection mode should not be interpreted as limitation to the embodiments of the present disclosure.

For different connection modes, the player device and the playing device need to support corresponding communication technologies. For example, for Bluetooth technology, the player device and the playing device both need to support Bluetooth; and for wireless fidelity (WiFi, Wi-Fi Alliance), the player device and the playing device both need to support WiFi. At present, there are a variety of wireless communication technologies, which would not affect implementations of the embodiments of the present disclosure. The above examples should not be interpreted as limitation to the embodiments of the present disclosure. The playing device may be any playing device, such as a wireless headphone or a wireless loudspeaker enclosure. Alternatively, the playing device may be any terminal with play function, such as a mobile phone, a personal digital assistant (PDA), a wireless headphone or a notebook computer. Specific physical devices embodied as the playing device and the player device are not limited herein.

Optionally, an optional solution for the wireless connection is provided according to an embodiment of the present disclosure, which is described as follows: the establishing a wireless connection between the player device and the playing device includes: establishing, by the player device, the wireless connection with two or more playing devices, via Bluetooth or wireless fidelity.

In this case, in the embodiment, the player device and the playing device both need to support Bluetooth or both need to support wireless fidelity (WiFi, Wi-Fi Alliance). The playing device supporting Bluetooth may be a Bluetooth headphone.

Bluetooth is a wireless technology supporting short-distance (generally within 10 m) communications among devices. Bluetooth can be used for implementing wireless information exchanges among various devices, such as mobile phone, personal digital assistant (PDA), wireless headphone, notebook computer and related peripheral. With the "Bluetooth" technology, communications among mobile communication terminal equipments can be effectively simplified, and communications between a device and the Internet can also be simplified, so that data transmission is more rapid and efficient, which widens the road for wireless communications. Bluetooth technology uses a distributed network structure, a fast frequency hopping technology and a short packet technology, supports point-to-point communication and point-to-multipoint communications, and operates in a global universal frequency band of 2.4 GHz ISM (Industrial Scientific Medical, i.e., industry, science and medicine). Bluetooth has a data rate of 1 Mbps, and implements full-duplex transmission by using time-divisional duplex transmission. Three major features of the Bluetooth technology are omnidirection, transmission of voice and data, and capable of be connected with multiple devices, respectively. A Bluetooth headphone is a playing device on which the Bluetooth technology is applied to enable a user to make phone call freely and easily in various manners without the trouble caused by wires.

In the embodiments of the present disclosure, a device supporting wireless data transmission usually has a wireless search function. For example, in a case that the player device supporting Bluetooth performs searching and finds nearby Bluetooth devices, the found Bluetooth devices may be displayed. For example, the found Bluetooth devices may be displayed in a form of a list as shown in following Table 1.

TABLE 1

| list of Bluetooth devices | |
| --- | --- |
| number | found Bluetooth devices |
| 1 | mobile phone of xxx |
| 2 | PAD of xxxxx |
| 3 | Bluetooth headphone for PAD of xxxxxx |
| 4 | memory of xxxxxx |
| ... | ... |
| N | loudspeaker enclosure for PAD of xxxxxx |

In Table 1, devices with numbers of 1, 2, 3 and N each may be used as a playing device. For the player device, it is enough to just display the found devices. If a user selects a device which is to be connected with the player device, then identity authentication is to be performed. A specific flow may include: the user inputting the account and the password into the player device, and the player device authenticating the account and the password, and determining the device as a valid device if the authentication is passed. In this way, the account of the playing device is bound. If the playing device is found in the next search, the player device will find that the account associated with the playing device is stored.

Optionally, if the player device establishes a wireless connection with the playing device via Bluetooth or wireless fidelity, the process of establishing the correspondence between the playing device and the account may include: storing a correspondence between an address of the playing device and the account.

For different wireless communication technologies, the address may be represented in different forms correspondingly. The address corresponding to WiFi may be a media access control (MAC) address of the playing device. The address corresponding to Bluetooth may be a Bluetooth address.

A Bluetooth headphone is taken as an example. A Bluetooth address has 48 bits, and its uniqueness is guaranteed because of its design. After being associated with a login account of a user, the Bluetooth address can be used for user identification and login. In other words, when the Bluetooth headphone is connected with the player device, the account corresponding to an address of the Bluetooth headphone is logged in automatically; and when the Bluetooth headphone is disconnected from the player device, the account corresponding to the address of the Bluetooth headphone is logged out automatically. In this way, the trouble of manually inputting the account and the password is avoided for the user.

In step 103, login of the account is allowed based on the correspondence between the playing device and the account.

The playing device corresponds to the account. If the correspondence between the playing device and the account is stored, then it may be determined that a valid device is recognized, and an automatic login process may be completed. For the playing device, such as a Bluetooth headphone, after authentication is passed for a first time, the correspondence between the Bluetooth headphone and the account is stored subsequently. And if the Bluetooth headphone is found by the player device later, authentication will be passed directly, so that the trouble of manually inputting the account and the password is avoided for the user.

In step 104, a play control operating instruction of the playing device is received and executed.

In the embodiment, after the connection between the player device and the playing device is established, the player device may directly allows the login of the account based on the correspondence between the playing device and the account, so that the user does not need to input the account and the password, and quick login is achieved conveniently and quickly.

Figure 2:
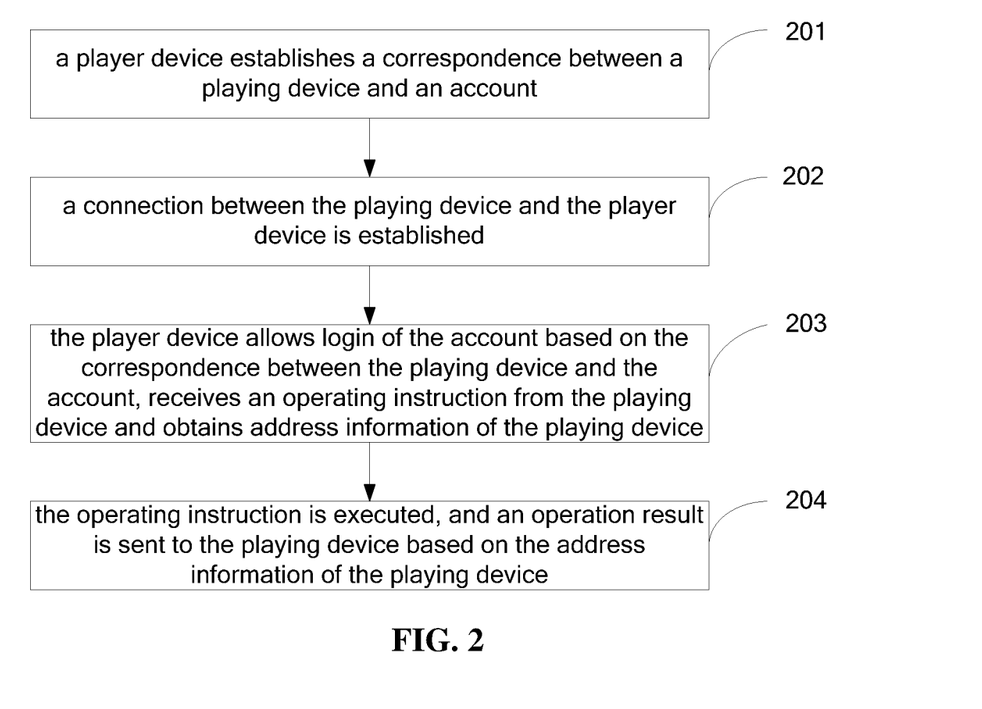
FIG. 2 is a schematic flow chart of a play controlling method according to another embodiment of the present disclosure.

A play controlling method is further provided according to an embodiment of the present disclosure. As shown in FIG. 2, the method includes steps 201 to 204.

In step 201, a player device establishes a correspondence between a playing device and an account.

In the embodiment, when a connection between the playing device and the player device is established for a first time, the player device may receive the account and a password corresponding to the playing device, and establish and store the correspondence between the playing device and the account after the account and the password are determined to be valid.

In case of multiple playing devices, the player device may establish and store correspondences between the multiple playing devices and accounts, based on the accounts and passwords corresponding to the multiple playing devices.

In step 202, a connection between the playing device and the player device is established.

Optionally, the establishing a wireless connection between the player device and the playing device includes: establishing, by the player device, the wireless connection with two or more playing devices, via Bluetooth or wireless fidelity.

For different connection modes, the player device and the playing device need to support corresponding communication technologies. For example, for Bluetooth technology, the player device and the playing device both need to support Bluetooth; and for wireless fidelity (WiFi, Wi-Fi Alliance), the player device and the playing device both need to support WiFi. At present, there are a variety of wireless communication technologies, which would not affect implementations of the embodiments of the present disclosure. The above examples should not be interpreted as limitation to the embodiments of the present disclosure.

Furthermore, before the connection between the player device and the playing device is established, all playing devices which are connected with the player device are displayed, and the account and the password of the corresponding playing device are received. After the account and the password are determined to be valid, the correspondence between the playing device and the account are established and stored.

In above embodiments, a device supporting wireless data transmission usually has a wireless search function. For example, in a case that the player device supporting Bluetooth performs searching and finds nearby Bluetooth devices, the found Bluetooth devices may be displayed. For the player device, it is enough to just display the found devices. If a user selects a device which is to be connected with the player device, then identity authentication is to be performed.

Furthermore, the method further includes: if the player device establishes a wireless connection with the playing device via Bluetooth or wireless fidelity, the establishing a correspondence between a playing device and an account may include: storing, a correspondence between an address of the playing device and the account.

For different wireless communication technologies, the address may be represented in different forms correspondingly. The address corresponding to WiFi may be a media access control (MAC) address of the playing device. The address corresponding to Bluetooth may be a Bluetooth address.

In step 203, the player device allows login of the account based on the correspondence between the playing device and the account, receives an operating instruction from the playing device and obtains address information of the playing device.

If the player device establishes wireless connection with two or more playing devices via Bluetooth or wireless fidelity in the previous step, then the address information in this step includes: Bluetooth address or wireless fidelity address of the playing devicees. Specifically, the address corresponding to WiFi may be a media access control (MAC) address of the playing device; and the address corresponding to Bluetooth may be a Bluetooth address.

In step 204, the operating instruction is executed, and an operation result is sent to the playing device based on the address information of the playing device.

In the embodiment, after the connection between the player device and the playing device is established, the player device may directly allows, based on the correspondence between the playing device and the account, the login of the account and execute the operating instruction sent by the playing device, so that the user does not need to input the account and the password, and quick login is achieved conveniently and quickly. The player device may store multiple associated accounts, which provides convenience for multiple users to log in. In addition, multiple users connected at the same time are differentiated based on addresses of the playing devices, and audio stream, video stream, or other operation result may be sent to corresponding users, so that multi-user data transmission can be realized, and the multiple users are not affected by each other.

In the following embodiment, the case that a Bluetooth headphone is used a playing device and a music player is used as a player device is taken as an example to describe the embodiments of the present disclosure in more detail. In the embodiment of the present disclosure, the music player generally refers to music player software which runs on a personal computer (personal computer, PC) or a mobile phone, or a music player device combining software and hardware. An address of the Bluetooth headphone has 48 bits, and its uniqueness is guaranteed because of its design. After a correspondence is established between the Bluetooth address and a login account of a user, it can be used for user identification and login. In other words, when the Bluetooth headphone is connected with the music player, the account corresponding to an address of the Bluetooth headphone is logged in automatically; and when the Bluetooth headphone is disconnected from the music player, the account corresponding to the address of the Bluetooth headphone is logged out automatically. In this way, the trouble of manually inputting the account and the password is avoided for the user. In the embodiments of the present disclosure, multiple users may log in at the same time without disturbing each other. In addition, the multiple users that have logged in at the same time each may perform a play control operation on his or her favorite song independently. And the music player may differentiate operations of different users based on addresses of Bluetooth headphones, and output multiple audios to the different Bluetooth headphones respectively, thereby realizing that the same music player is shared by the multiple users independently at the same time.

In the following embodiment, two flows are described: the first one is establishing a correspondence between a Bluetooth headphone and a user account, and the second one is implementing multi-user login and play control operations by using the Bluetooth headphone.

1. The process of establishing a correspondence between a Bluetooth headphone and a user account is illustrated in Table 2.

TABLE 2

| Bluetooth headphone | music player |
|---|---|
| 1. a user connects the Bluetooth headphone to the music player | |
| | 2. the music player receives connection information of the Bluetooth headphone |
| 3. the user selects an account to be associated | |
| | 4. the music player displays a list of names of all Bluetooth headphones that have been connected |
| 5. the user selects a headphone, and inputs the account and a password which are to be associated with the headphone | |
| | 6. the music player verifies validity of the account and the password, and associates an address of the selected Bluetooth headphone with the account in a case that the account and the password are valid |

In Table 2, the numbers represent an implementation sequence, steps in the column where the Bluetooth headphone is located are performed by the Bluetooth headphone, and steps in the column where the music player is located are performed by the music player.

2. The process of implementing multi-user login and play control operations by using the Bluetooth headphone is illustrated in Table 3.

TABLE 3

| Bluetooth headphone | music player |
|---|---|
| 1. a user connects the Bluetooth headphone to the music player | |
| | 2. the music player checks whether an address of the Bluetooth headphone has been associated with an account, and if has been associated, logs in automatically with the associated account |
| 3. the user performs a play control operation on the Bluetooth headphone | |
| | 4. the music player receives operation requests, outputs decoded audio to corresponding Bluetooth headphones based on Bluetooth addresses from which the requests are originated, and performs play control operations such as play, pause, stop, fast forward, rewind, previous, next, volume adjustment and mute, for different headphones independently |
| 5. the user disconnects the Bluetooth headphone from the music player | |
| | 6. the music player finishes the play, logs out the account associated with the headphone |

In Table 3, the numbers represent an implementation sequence, steps in the column where the Bluetooth headphone is located are performed by the Bluetooth headphone, and steps in the column where the music player is located are performed by the music player.

In the above embodiment, the music player generally refers to music player software which runs on a PC or a mobile phone, or a music player device combining software and hardware. Besides the headphone, the playing device may also be other device such as a loudspeaker. Bluetooth technology is used in the embodiment of the present disclosure. Besides the Bluetooth technology, other wireless communication technology may be used in the embodiment of the present disclosure, such as WiFi (in which MAC address has a function similar to the Bluetooth address).

Figure 3:
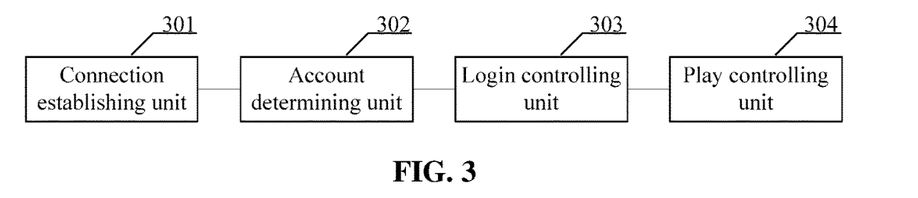
FIG. 3 is a schematic structural diagram of a player device according to an embodiment of the present disclosure.

As shown in FIG. 3, a player device is provided according to an embodiment of the present disclosure, which includes:

a connection establishing unit 301, configured to establish a connection with a playing device; where the player device is a device in which a player resides, and the playing device is a device which executes playing;

an account determining unit 302, configured to determine whether a account corresponding to the playing device is stored in the player device;

a login controlling unit 303, configured to allow login of the account if it is determined by the account determining unit 302 that the account corresponding to the playing device is stored in the player device; and a play controlling unit 304, configure to receive and execute a play control operating instruction of the playing device after the login of the account is completed by the login controlling unit 303.

In the embodiment, if a correspondence between the playing device and the account is stored in the player device, then the login of the account may be allowed based on the correspondence. For the playing device such as a Bluetooth headphone, after authentication is passed for a first time, correspondence between the Bluetooth headphone and the account is stored subsequently. And if the Bluetooth headphone is found by the player device later, authentication will be passed directly, so that the trouble of manually inputting the account and a password is avoided for a user.

In the embodiment, after the connection between the player device and the playing device is established, the player device determines whether the correspondence between the playing device and the account is stored in the player device, and the login of the account is allowed directly if the correspondence between the playing device and the account is stored in the player device, so that the user does not need to input the account and the password, and quick login is achieved conveniently and quickly. The player device may stores correspondences between multiple playing devices and accounts, which is convenient for multiple users to log in.

Optionally, the connection between the player device and the playing device may be a wired connection or a wireless connection, which would not affect implementations of the embodiments of the present disclosure. In order to perform play control operation freely and easily in various manners without the troubles caused by wires, the connection establishing unit 301 is preferably configured to establish a wireless connection with the playing device.

The wireless connection is a preferred implementation, and should not be interpreted as the only implementation of a connection mode used for establishing the connection between the player device and the playing device. Therefore, a wireless connection mode should not be interpreted as limitation to the embodiments of the present disclosure.

For different connection modes, the player device and the playing device need to support corresponding communication technologies. For example, for Bluetooth technology, the player device and the playing device both need to support Bluetooth; and for wireless fidelity (WiFi, Wi-Fi Alliance), the player device and the playing device both need to support WiFi. At present, there are a variety of wireless communication technologies, which would not affect implementations of the embodiments of the present disclosure. The above examples should not be interpreted as limitation to the embodiments of the present disclosure. The playing device may be any playing device, such as a wireless headphone or a wireless loudspeaker enclosure. Alternatively, the playing device may be any terminal with play function, such as a mobile phone, a personal digital assistant (PDA), a wireless headphone or a notebook computer. Specific physical devices embodied as the playing device and the player device are not limited herein.

Optionally, an optional solution for the wireless connection is provided according to an embodiment of the present disclosure, which is described as follows: the connection establishing unit 301 is configured to establishing the wireless connection with two or more playing devices via Bluetooth or wireless fidelity.

In this case, in the embodiment, the player device and the playing device both need to support Bluetooth or both need to support wireless fidelity (WiFi, Wi-Fi Alliance). The playing device supporting Bluetooth may be a Bluetooth headphone.

Figure 4:
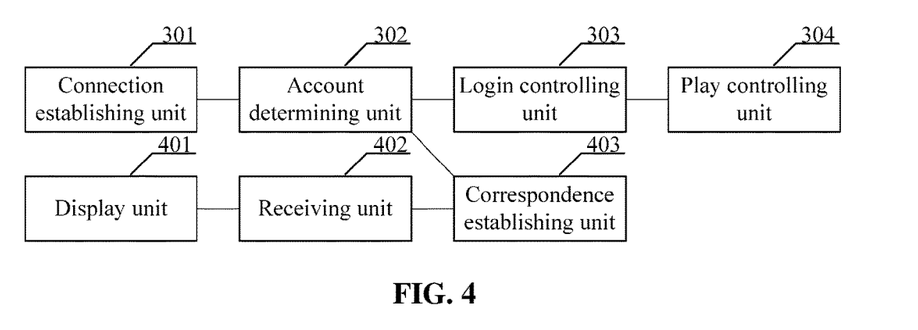
FIG. 4 is a schematic structural diagram of a player device according to an embodiment of the present disclosure.

Furthermore, a specific solution for establishing a correspondence between the correspondence between the playing device and the account performed by the player device is provided according to an embodiment of the present disclosure, which is described as follows: as shown in FIG. 4, the player device further includes:

a display unit 401, configured to display all playing devices which are connected with the player device, before the connection establishing unit 301 establishes the connection with the playing device;

a receiving unit 402, configured to receive the account and the password of the corresponding playing device; and a correspondence establishing unit 403, configured to establish and store the correspondence between the playing device and the account, after the account and the password received by the receiving unit 402 are determined to be valid.

In the embodiment, a device supporting wireless data transmission usually has a wireless search function. For example, in a case that the player device supporting Bluetooth performs searching and finds nearby Bluetooth devices, the found Bluetooth devices may be displayed. For the player device, it is enough to just display the found devices. If the user selects a device which is to be connected with the player device, then identity authentication is to be performed. A specific flow may include: the user inputting the account and the password into the player device, the player device authenticating the account and the password, and determining the device as a valid device if the authentication is passed. In this way, the account of the playing device is established. If the playing device is found in the next search, the player device will find that the account associated with the playing device is stored.

Optionally, the connection establishing unit 403 is configured to establish and store a correspondence between an address of the playing device and the account if the player device establishes a wireless connection with the playing device via Bluetooth or wireless fidelity.

For different wireless communication technologies, the address may be represented in different forms correspondingly. The address corresponding to WiFi may be a media access control (MAC) address of the playing device. The address corresponding to Bluetooth may be a Bluetooth address.

A Bluetooth headphone is taken as an example. A Bluetooth address has 48 bits, and its uniqueness is guaranteed because of its design. After the Bluetooth address is associated with a login account of a user, it can be used for user identification and login. In other words, when the Bluetooth headphone is connected with the player device, the account corresponding to an address of the Bluetooth headphone is logged in automatically; and when the Bluetooth headphone is disconnected from the player device, the account corresponding to the address of the Bluetooth headphone is logged out automatically. In this way, the trouble of manually inputting the account and the password is avoided for the user.

Figure 5:
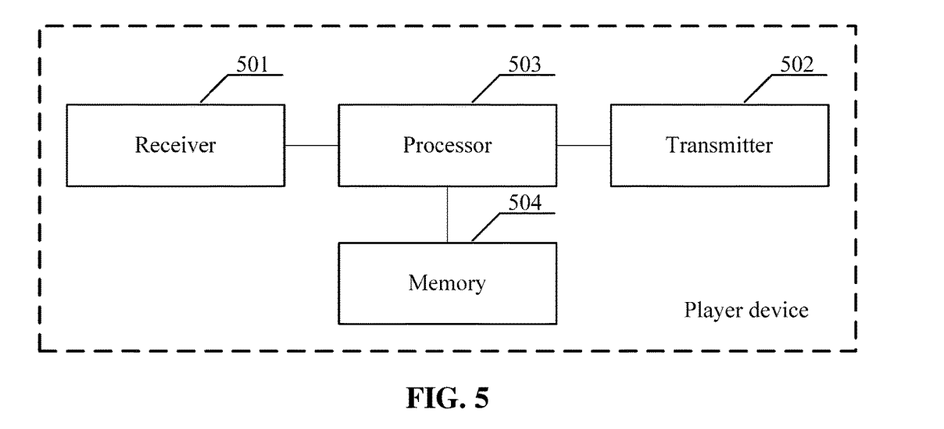
FIG. 5 is a schematic structural diagram of a player device according to an embodiment of the present disclosure.

As shown in FIG. 5, another player device is provided according to an embodiment of the present disclosure, which includes: a receiver 501, a transmitter 502, a processor 503 and a memory 504.

The processor 503 is configured to control the player device to establish a connection with a playing device; where the player device is a device in which a player resides, and the playing device is a device which executes playing; determine whether a account corresponding to the playing device is stored in the player device; allow login of the account if it is determined that the account corresponding to the playing device is stored in the player device; and receive and execute a play control operating instruction of the playing device after the account logs-in.

In the embodiment, if a correspondence between the playing device and the account is stored in the player device, then the login of the account may be allowed based on the correspondence. For the playing device, such as a Bluetooth headphone, after authentication is passed for a first time, the correspondence between the Bluetooth headphone and the account is stored subsequently. And if the Bluetooth headphone is found by the player device later, authentication will be passed directly, so that the trouble of manually inputting the account and a password is avoided for a user.

In the embodiment, after the connection between the player device and the playing device is established, the player device determines whether the correspondence between the playing device and the account is stored in the player device, and the login of the account is allowed directly in a case that the correspondence between the playing device and the account is stored in the player device, so that the user does not need to input the account and the password, and quick login is achieved conveniently and quickly. The player device may stores correspondences between multiple playing devices and accounts, which is convenient for multiple users to log in.

Optionally, the connection between the player device and the playing device may be a wired connection or a wireless connection, which would not affect implementations of the embodiments of the present disclosure. In order to perform play control operation freely and easily in various manners without the troubles caused by wires, the processor 503 is preferably configured to control the player device to establish a wireless connection with the playing device.

The wireless connection is a preferred implementation, and should not be interpreted as the only implementation of a connection mode used for establishing the connection between the player device and the playing device. Therefore, a wireless connection mode should not be interpreted as limitation to the embodiments of the present disclosure.

For different connection modes, the player device and the playing device need to support corresponding communication technologies. For example, for Bluetooth technology, the player device and the playing device both need to support Bluetooth; and for wireless fidelity (WiFi, Wi-Fi Alliance), the player device and the playing device both need to support WiFi. At present, there are a variety of wireless communication technologies, which would not affect implementations of the embodiments of the present disclosure. The above examples should not be interpreted as limitation to the embodiments of the present disclosure. The playing device may be any playing device, such as a wireless headphone or a wireless loudspeaker enclosure. Alternatively, the playing device may be any terminal with play function, such as a mobile phone, a personal digital assistant (PDA), a wireless headphone or a notebook computer. Specific physical devices embodied as the playing device and the player device are not limited herein.

Optionally, an optional solution for the wireless connection is provided according to an embodiment of the present disclosure, which is described as follows: the processor 503 is configured to control the player device to establish the wireless connection with the playing device, including: controlling the player device, to establish the wireless connection with two or more playing devices via Bluetooth or wireless fidelity.

In this case, in the embodiment, the player device and the playing device both need to support Bluetooth or both need to support wireless fidelity (WiFi, Wi-Fi Alliance). The playing device supporting Bluetooth may be a Bluetooth headphone.

Furthermore, a specific solution for establishing and storing the correspondence by the player device is provided according to an embodiment of the present disclosure, which is described as follows: the processor 503 is configured to: before controlling the player device to establish the connection with the playing device, display all playing devices which are connected with the player device, receive the account and the password of the corresponding playing device, and establish and store the correspondence between the playing device and the account after the account and the password are determined to be valid.

In the embodiment, a device supporting wireless data transmission usually has a wireless search function. For example, in a case that the player device supporting Bluetooth performs searching and finds nearby Bluetooth devices, the found Bluetooth devices may be displayed. For the player device, it is enough to just display the found devices. If a user selects a device which is to be connected with the player device, then identity authentication is to be performed. A specific flow includes: the user inputting the account and the password into the player device, the player device authenticating the account and the password, and determining the device as a valid device if the authentication is passed. In this way, the account of the playing device is established. If the playing device is found in the next search, the player device will find that the account associated with the playing device is stored.

Optionally, if the player device establishes a wireless connection with the playing device via Bluetooth or wireless fidelity, the processor 503 is configured to establish and store a correspondence between an address of the playing device and the account.

For different wireless communication technologies, the address may be represented in different forms correspondingly. The address corresponding to WiFi may be a media access control (MAC) address of the playing device. The address corresponding to Bluetooth may be a Bluetooth address.

A Bluetooth headphone is taken as an example. A Bluetooth address has 48 bits, and its uniqueness is guaranteed because of its design. After the Bluetooth address is associated with a login account of a user, it can be used for user identification and login. In other words, when the Bluetooth headphone is connected with the player device, the account corresponding to an address of the Bluetooth headphone is logged in automatically; and when the Bluetooth headphone is disconnected from the player device, the account corresponding to the address of the Bluetooth headphone is logged out automatically. In this way, the trouble of manually inputting the account and the password is avoided for the user.

Figure 6:
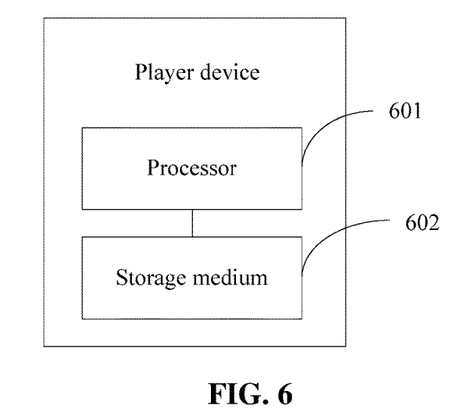
FIG. 6 is a schematic structural diagram of a player device according to an embodiment of the present disclosure.

As shown in FIG. 6, another player device is further provided according to an embodiment of the present disclosure, which includes one or more processors 601 and a storage medium 602 having operating instructions stored thereon, where the one or more processors 601 are configured to, when executing the operating instructions stored in the storage medium 602, execute the following steps:

establishing a correspondence between a playing device and an account;

establishing a connection between the playing device and the player device;

allowing login of the account based on the correspondence between the playing device and the account; and receiving and executing, a play control operating instruction of the playing device.

In the embodiment of the present disclosure, the processors 601 are further configured to execute the following step: receiving the account and a password of the playing device, and storing the correspondence between the playing device and the account after the account and the password are determined to be valid.

Figure 7:
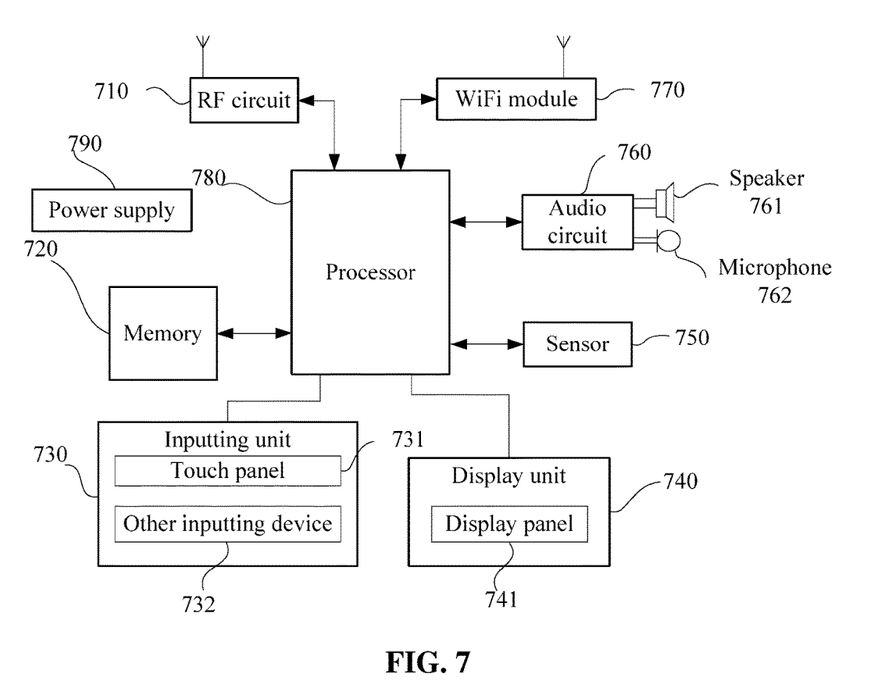
FIG. 7 is a schematic structural diagram of a terminal according to an embodiment of the present disclosure.

Another player device is provided according to an embodiment of the present disclosure. As shown in FIG. 7, a terminal is taken as an example. In order to facilitate illustration, only parts related to the embodiments of the present disclosure are illustrated, and for the technical details, please refer to the methods in the embodiments of the present disclosure. The terminal may be any terminal device such as a mobile phone, a tablet computer, a personal digital assistant (PDA), a point of sales (POS) and a vehicle-carried computer. A case in which the terminal is a mobile phone is taken as an example.

FIG. 7 is a block diagram showing partial structure of a mobile phone which is related to a terminal provided according to an embodiment of the present disclosure. Referring to FIG. 7, the mobile phone includes: a radio frequency (RF) circuit 710, a memory 720, an inputting unit 730, a display unit 740, a sensor 750, an audio circuit 760, a wireless fidelity (WiFi) module 770, a processor 780, a power supply 790 and so on. It can be understood by those skilled in the art that, the structure of the mobile phone illustrated in FIG. 7 is not limitation to the mobile phone. The technical solution according to the present disclosure may include more or less components than those shown in FIG. 7, or have some components combined, or use a different arrangement of the components.

In conjunction with FIG. 7, each of components of the mobile phone is described in detail.

The RF circuit 770 may be configured to receive and send information, or to receive and send signals in a call, and particularly, receive downlink information of a base station for the processor 780 to process; and sends uplink data to a base station. Usually, the RF circuit includes, but not limited to, an antenna, at least one amplifier, a transceiver, a coupler, a low noise amplifier (LNA), a duplexer, and so on. In addition, the RF circuit 710 may also communicate with other devices by means of wireless communication or network. The wireless communication may use any communication standard or protocol, which includes, but not limited to, global system of mobile communication (GSM), general packet radio service (GPRS), code division multiple access (CDMA), wideband code division multiple access (WCDMA), long term evolution (LTE), email, short messaging service (SMS), and so on.

The memory 720 may be configured to store software programs and modules, and the processor 780 executes functional applications of the mobile phone and data processing by running the software programs and modules stored in the memory 720. The memory 720 may mainly include a program storing region and a data storing region, where the program storing region may store an operating system, an application program which is needed for at least one function (such as an audio playing function and an image playing function); and the data storing region may store data established based on use of the mobile phone (such as audio data and a phone book). In addition, the memory 720 may include a high speed random access memory, and may also include a non-volatile memory such as at least one magnetic disk storage device or a flash memory, or other volatile solid-state memory.

The inputting unit 730 may be configured to receive an inputted number or character information, and generate a signal input related to user setting and function controlling of the mobile phone 700. Specifically, the inputting unit 730 may include a touch panel 731 and other inputting device 732. The touch panel 731, also referred to as a touch screen, may collect touch operations of a user which are performed on or near to the touch panel (such as operations performed by the user on the touch panel 731 or near to the touch panel 731, with a proper object or accessory such as a finger or a stylus), and drive a corresponding connecting device based on a preset program. Optionally, the touch panel 731 may include a touch detecting device and a touch controlling device. The touch detecting device detects a touch location of the user, detects a signal generated due to an touch operation, and sends the signal to the touch controlling device; the touch controlling device receives touch information from the touch detecting device, converts the touch information into coordinates of a touch point, sends the coordinates to the processor 780, and receive an instruction from the processor 780 and execute the instruction. In addition, the touch panel 731 may be resistive, capacitive, infrared or surface acoustic, and so on. In addition to the touch panel 731, the inputting unit 730 may further include the other inputting device 732. Specifically, the other inputting device 732 may include, but not limited to, one or more of a physical keyboard, a function button (such as a volume controlling button or a switch button), a trackball, a mouse, an operating rod and so on.

The display unit 740 may be configured to display information inputted by the user or provided for the user, and various menus of the mobile phone. The display unit 740 may include a display panel 741. Optionally, the display panel 741 may be configured in a form of liquid crystal display (LCD), or organic light-emitting diode (OLED) and so on. Furthermore, the touch panel 731 may cover the display panel 711, and in a case that the touch panel 731 detects the touch operation on or near to the touch panel, the touch panel sends the touch operation to the processor 780 to determine a type of a touch event, then the processor 780 provides a corresponding visual output on the display panel 741 based on the type of touch event. In FIG. 7, although the touch panel 731 and the display panel 741 are used as two individual components to realize an inputting function and an outputting function of the mobile phone, the touch panel 731 and the display panel 741 may be integrated to realize the inputting function and the outputting function of the mobile phone in some embodiments.

The mobile phone 700 may further include the at least one sensor 750, such as a light sensor, a motion sensor and other sensor. Specifically, the light sensor may include an ambient light sensor and a proximity sensor, the ambient light sensor may adjust brightness of the display panel 741 based on brightness of ambient light, and the proximity sensor may close the display panel 741 and/or backlight in a case that the mobile phone moves to an ear. As one of motion sensors, a gravity acceleration sensor may detect magnitude of an acceleration in each of directions (there are usually three axes), detect magnitude and a direction of gravity while being at rest, and be applied to an application for recognizing a gesture of the mobile phone (such as switching between portrait and landscape orientation, a related game or calibration of gesture of a magnetometer) and to a function related to vibration recognition (such as a pedometer or a click). Other sensors which may be provided for the mobile phone, such as a gyroscope, a barometer, a hygrometer, a thermometer or an infrared sensor, are not described herein.

The audio circuit 760, a speaker 761 and a microphone 762 may provide an audio interface between the user and the mobile phone. The audio circuit 760 may send an electrical signal, converted from received audio data, to the speaker 761, and then the speaker 761 converts it into an audio signal for outputting. On the other hand, the microphone 762 converts a collected audio signal to an electrical signal, the electrical signal is received by the audio circuit 760 and then converted into audio data, and after the audio data is outputted to and processed by the processor 780, the audio data is sent to another mobile phone via the RF circuit 710, or the audio data is outputted to the memory 720 for further processing.

WiFi belongs to a short-distance wireless transmission technology. The mobile phone may help the user receive and send emails, browse a webpage, and access to streaming media, with the WiFi module 770, and the WiFi module provides wireless broadband internet access for the user. Although the WiFi module 770 is illustrated in FIG. 7, it can be understood that, the WiFi module 770 is not a necessary constituent of the mobile phone 700, and may be omitted based on requirements without changing essence of the present disclosure.

The processor 780 is a control center of the mobile phone, which connects each part of the mobile phone through interfaces and circuits, and performs various functions of the mobile phone and data processing, by running or executing the software programs and/or modules stored in the memory 720 and calling data stored in the memory 720, thereby realizing overall monitoring of the mobile phone. Optionally, the processor 780 may include one or more processing units; preferably, the processor 780 may integrate an application processor and a modem processor, the application processor is mainly configured to process operating systems, user interfaces and applications, and the modem processor is mainly configured to process wireless communications. It can be understood that the modem processor may not be integrated into the processor 780.

The mobile phone 700 further includes the power supply 790 (such as a battery) configured to power all the components. Preferably, the power supply may be logically connected with the processor 780 via a power supply management system, so that functions such as charging managing, discharging and power consumption, can be realized with the power supply management system.

The mobile phone 700 may further include, although not shown, a camera, a Bluetooth module, and so on, which is not described herein.

In the embodiment of the present disclosure, the processor 780 included in the terminal further has the following function:

establishing a correspondence between a playing device and an account;

establishing a connection between the playing device and the player device;

allowing login of the account based on the correspondence between the playing device and the account; and receiving and executing, a play control operating instruction of the playing device.

In the embodiment, if the correspondence between the playing device and the account is stored in the player device, the login of the account may be allowed based on the correspondence. For the playing device, such as a Bluetooth headphone, after authentication is passed for a first time, the correspondence between the Bluetooth headphone and the account is stored subsequently. And if the Bluetooth headphone is found by the player device later, authentication will be passed directly, so that the trouble of manually inputting the account and a password is avoided for a user.

In the embodiment, after the connection between the player device and the playing device is established, the player device determines whether the correspondence between the playing device and the account is stored in the player device, and the login of the account is allowed directly in a case that the correspondence between the playing device and the account is stored in the player device, so that the user does not need to input the account and the password, and quick login is achieved conveniently and quickly. The player device may stores correspondences between multiple playing devices and accounts, which provides convenience for multiple users to log in.

Optionally, the connection between the player device and the playing device may be a wired connection or a wireless connection, which would not affect implementations of the embodiments of the present disclosure. In order to perform play control operation freely and easily in various manners without the troubles caused by wires, the processor 780 is preferably configured to control the player device to establish a wireless connection with the playing device.

The wireless connection is a preferred implementation, and should not be interpreted as the only implementation of a connection mode used for establishing the connection between the player device and the playing device. Therefore, a wireless connection mode should not be interpreted as limitation to the embodiments of the present disclosure.

For different connection modes, the player device and the playing device need to support corresponding communication technologies. For example, for Bluetooth technology, the player device and the playing device both need to support Bluetooth; and for wireless fidelity (WiFi, Wi-Fi Alliance), the player device and the playing device both need to support WiFi. At present, there are a variety of wireless communication technologies, which would not affect implementations of the embodiments of the present disclosure. The above examples should not be interpreted as limitation to the embodiments of the present disclosure. The playing device may be any playing device, such as a wireless headphone or a wireless loudspeaker enclosure. Alternatively, the playing device may be any terminal with play function, such as a mobile phone, a personal digital assistant (PDA), a wireless headphone or a notebook computer. Specific physical devices embodied as the playing device and the player device are not limited herein.

Optionally, an optional solution for the wireless connection is provided according to an embodiment of the present disclosure, which is described as follows: the processor 780 is configured to controll the player device to establish the wireless connection with two or more playing devices, via Bluetooth or wireless fidelity.

In this case, in the embodiment, the player device and the playing device both need to support Bluetooth or both need to support wireless fidelity (WiFi, Wi-Fi Alliance). The playing device supporting Bluetooth may be a Bluetooth headphone.

Furthermore, a specific solution for establishing and storing the correspondence by the player device is provided according to an embodiment of the present disclosure, which is described as follows: the processor 780 is configured to: before controlling the player device to establish the connection with the playing device, display all playing devices which are connected with the player device, receive the account and the password of the corresponding playing device, and establish and store the correspondence between the playing device and the account after the account and the password are determined to be valid.

In the embodiment, a device supporting wireless data transmission usually has a wireless search function. For example, in a case that the player device supporting Bluetooth performs searching and finds nearby Bluetooth devices, the found Bluetooth devices may be displayed. For the player device, it is enough to just display the found devices. If a user selects a device which is to be connected with the player device, then identity authentication is to be performed. A specific flow includes: the user inputting the account and the password into the player device, the player device authenticating the account and the password, and determining the device as a valid device if the authentication is passed. In this way, the account of the playing device is established. If the playing device is found in the next search, the player device will find that the account corresponding to the playing device is stored.

Optionally, if the player device establishes a wireless connection with the playing device via Bluetooth or wireless fidelity, the processor 780 is configured to establish and store a correspondence between an address of the playing device and the account.

For different wireless communication technologies, the address may be represented in different forms correspondingly. The address corresponding to WiFi may be a media access control (MAC) address of the playing device. The address corresponding to Bluetooth may be a Bluetooth address.

A Bluetooth headphone is taken as an example. A Bluetooth address has 48 bits, and its uniqueness is guaranteed because of its design. After the Bluetooth address is associated with a login account of a user, it can be used for user identification and login. In other words, when the Bluetooth headphone is connected with the player device, the account corresponding to an address of the Bluetooth headphone is logged in automatically; and when the Bluetooth headphone is disconnected from the player device, the account corresponding to the address of the Bluetooth headphone is logged out automatically. In this way, the trouble of manually inputting the account and the password is avoided for the user.

It should be noted that, the units included in the embodiments of the player device are divided according to functional logics; and the division is not limited to the above approach, as long as corresponding functions can be realized. In addition, specific names of the functional units are used to distinguish among these units and are not used to limit the protection scope of the present disclosure.

In addition, it can be understood by those skilled in the art that, all or some of the steps in the method embodiments may be implemented by related hardware instructed by a program. The program may be stored in a computer readable storage medium. The storage medium may be a read-only memory, a magnetic disk or an optical disk, and so on.

The above are only preferred embodiments of the present disclosure, and are not limitation to the protection scope of the present disclosure. Changes and substitutions, made by those skilled in the art without any creative efforts within the technical scope disclosed by the embodiments of the present disclosure, fall within the protection scope of the present disclosure. Therefore, the protection scope of the present disclosure is defined by the protection scope of the claims.

The invention claimed is:

1. A play controlling method comprising:
   establishing a first initial connection between (i) a media player running on a first device and (ii) a first audio output device of a first user, wherein establishing the first initial connection includes:
   connecting the first audio output device to the media player;
   receiving, from the first user after the first audio output device is connected to the media player, first account information for the media player, wherein the first account information includes a first account name and a first password;
   attempting to authenticate the first user with the media player based on the first account information; and
   in response to successful authentication of the first user with the media player, storing, by the first device, a correspondence between an identifier of the first audio output device and the first account information;
   establishing a second initial connection between (i) the media player and (ii) a second audio output device of a second user, wherein establishing the second initial connection includes:
   connecting the second audio output device to the media player;
   receiving, from the second user after the second audio output device is connected to the media player, second account information for the media player, wherein the second account information includes a second account name and a second password;
   attempting to authenticate the second user with the media player based on the second account information; and
   in response to successful authentication of the second user with the media player, storing, by the first device, a correspondence between an identifier of the second audio output device and the second account information;
   in response to a subsequent connection between the media player and the second audio output device following the second initial connection:
   checking whether the identifier of the second audio output device has been associated with the second account information;
   in response to the identifier of the second audio output device having been associated with the second account information, automatically authenticating and logging the second user into the media player by using the stored second account information without inputting the second account information including the second account name and the second password by the second user; and
   receiving and executing, by the media player, play control operating instructions of the second audio output device, wherein the play control operating instructions of the second audio output device are different than play control operating instructions of the first audio output device; and
   in response to the second audio output device being disconnected from the media player, automatically logging the second user out of the media player.

2. The method according to claim 1, wherein:
   storing the correspondence between the identifier of the first audio output device and the first account information includes storing a correspondence between a first hardware address of the first audio output device and the first account information, and
   storing the correspondence between the identifier of the second audio output device and the second account information includes storing a correspondence between a second hardware address of the second audio output device and the second account information.

3. The method according to claim 1, wherein the first initial connection and the second initial connection are wireless connections.

4. The method according to claim 1, further comprising:
   in response to a subsequent connection between the media player and the first audio output device following the first initial connection:

checking whether the identifier of the first audio output device has been associated with the first account information;

in response to the identifier of the first audio output device having been associated with the first account information, automatically authenticating and logging the first user into the media player by using the stored first account information without inputting the first account information including the first account name and the first password by the first user; and receiving and executing, by the media player, the play control operating instructions of the first audio output device.

5. The method according to claim 4, wherein the subsequent connection between the media player and the first audio output device is performed while the second audio output device is still connecting to the media player.

6. The method according to claim 1, wherein establishing the second initial connection between (i) the media player and (ii) the second audio output device is performed while the first audio output device is still connecting to the media player.

7. The method according to claim 1, wherein the media player includes music player software running on a hardware device.

8. The method according to claim 1, wherein the receiving and executing, by the media player, play control operating instructions of the second audio output device includes receiving and executing, the play control operating instructions of the first audio output device and the play control operating instructions of the second audio output device at the same time.

9. The method according claim 8, further comprising simultaneously playing and outputting, by the media player, first audio to the first audio output device and second audio to the second audio output device, wherein the first audio is different than the second audio.

10. The method according to claim 9, wherein automatically logging the second user out of the media player includes finishing playing, by the media player, the second audio.

11. A non-transitory computer readable medium having computer executable instructions stored thereon, wherein the computer executable instructions, when being executed by a processor, cause the processor to perform the following operations:

establishing a first initial connection between (i) a media player running on a first device and (ii) a first audio output device of a first user, wherein establishing the first initial connection includes:

connecting the first audio output device to the media player;

receiving, from the first user after the first audio output device is connected to the media player, first account information for the media player, wherein the first account information includes a first account name and a first password;

attempting to authenticate the first user with the media player based on the first account information; and in response to successful authentication of the first user with the media player, storing, by the first device, a correspondence between an identifier of the first audio output device and the first account information;

establishing a second initial connection between (i) the media player and (ii) a second audio output device of a second user, wherein establishing the second initial connection includes:

connecting the second audio output device to the media player;

receiving, from the second user after the second audio output device is connected to the media player, second account information for the media player, wherein the second account information includes a second account name and a second password;

attempting to authenticate the second user with the media player based on the second account information; and in response to successful authentication of the second user with the media player, storing, by the first device, a correspondence between an identifier of the second audio output device and the second account information;

in response to a subsequent connection between the media player and the second audio output device following the first and second initial connections:

checking whether an identifier of the second audio output device has been associated with the second account information;

in response to the identifier of the second audio output device having been associated with the second account information, automatically authenticating and logging the second user into the media player by using the stored second account information without inputting the second account information including the second account name and the second password by the second user; and receiving and executing, by the media player, play control operating instructions of the second audio output device, wherein the play control operating instructions of the second audio output device are different than play control operating instructions of the first audio output device; and in response to the second audio output device being disconnected from the media player, automatically logging the second user out of the media player.

12. The non-transitory computer readable medium of claim 11 wherein the computer executable instructions, when being executed by the processor, cause the processor to perform the following operations:

in response to the subsequent connection between the media player and the first audio output device:

checking whether the identifier of the first audio output device has been associated with the first account information;

in response to the identifier of the first audio output device having been associated with the first account information, automatically authenticating and logging the first user into the media player by using the stored first account information without inputting the first account information including the first account name and the first password by the first user; and receiving and executing, by the media player, the play control operating instructions of the first audio output device.

13. A system comprising:
a first audio output device of a first user;
a second audio output device of a second user; and
a media player running on a first device,
wherein the first device includes a processor and a non-transitory computer readable medium having computer executable instructions stored thereon, wherein the computer executable instructions, when being executed by the processor, cause the processor to perform the following operations:

establishing a first initial connection between (i) the media player and (ii) the first audio output device, wherein establishing the first initial connection includes:
- connecting the first audio output device to the media player;
- receiving, from the first user after the first audio output device is connected to the media player, first account information for the media player, wherein the first account information includes a first account name and a first password;
- attempting to authenticate the first user with the media player based on the first account information; and
- in response to successful authentication of the first user with the media player, storing, by the first device, a correspondence between an identifier of the first audio output device and the first account information;

establishing a second initial connection between (i) the media player and (ii) the second audio output device, wherein establishing the second initial connection includes:
- connecting the second audio output device to the media player;
- receiving, from the second user after the second audio output device is connected to the media player, second account information for the media player, wherein the second account information includes a second account name and a second password;
- attempting to authenticate the second user with the media player based on the second account information; and
- in response to successful authentication of the second user with the media player, storing, by the first device, a correspondence between an identifier of the second audio output device and the second account information;

in response to a subsequent connection between the media player and the second audio output device following the first and second initial connections:
- checking whether an identifier of the second audio output device has been associated with the second account information;
- in response to the identifier of the second audio output device having been associated with the second account information, automatically authenticating and logging the second user into the media player by using the stored second account information without inputting the second account information including the second account name and the second password by the second user; and
- receiving and executing, by the media player, play control operating instructions of the second audio output device, wherein the play control operating instructions of the second audio output device are different than play control operating instructions of the first audio output device; and in response to the second audio output device being disconnected from the media player, automatically logging the second user out of the media player.

14. The non-transitory computer readable medium of claim 13 wherein the computer executable instructions, when being executed by the processor, cause the processor to perform the following operations:

in response to the subsequent connection between the media player and the first audio output device:
- checking whether the identifier of the first audio output device has been associated with the first account information;
- in response to the identifier of the first audio output device having been associated with the first account information, automatically authenticating and logging the first user into the media player by using the stored first account information without inputting the first account information including the first account name and the first password by the first user; and
- receiving and executing, by the media player, the play control operating instructions of the first audio output device.

* * * * *

UNITED STATES PATENT AND TRADEMARK OFFICE
CERTIFICATE OF CORRECTION

PATENT NO. : 10,331,098 B2  
APPLICATION NO. : 15/167312  
DATED : June 25, 2019  
INVENTOR(S) : Bo Song Page 1 of 1

It is certified that error appears in the above-identified patent and that said Letters Patent is hereby corrected as shown below:

On the Title Page

Item (73), delete "(KR)" and insert -- (CN) --.

Signed and Sealed this  
Sixth Day of August, 2019

Andrei Iancu  
*Director of the United States Patent and Trademark Office*